May 26, 1953  A. G. BROWN  2,639,912
WEIGHING SCALE
Filed June 24, 1947  5 Sheets-Sheet 1

Inventor
Andrew G. Brown
by W. Bartlett Jones,
Attorney.

May 26, 1953     A. G. BROWN     2,639,912
WEIGHING SCALE

Filed June 24, 1947     5 Sheets-Sheet 2

Inventor
Andrew G. Brown
by W. Bartlett Jones
Attorney.

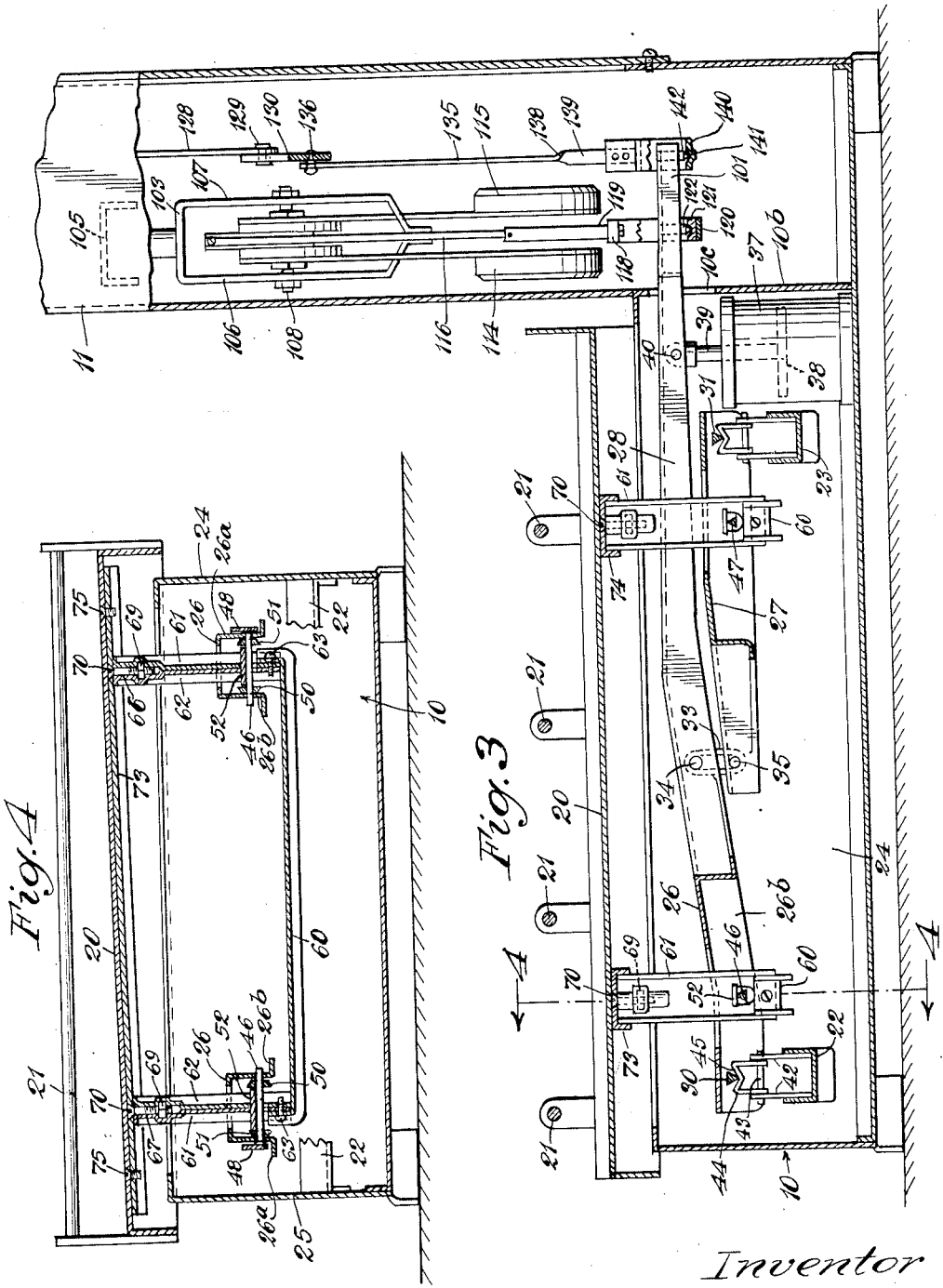

May 26, 1953  A. G. BROWN  2,639,912
WEIGHING SCALE

Filed June 24, 1947  5 Sheets-Sheet 4

Inventor
Andrew G. Brown
by W. Bartlett Jones
Attorney.

May 26, 1953  A. G. BROWN  2,639,912
WEIGHING SCALE
Filed June 24, 1947  5 Sheets-Sheet 5
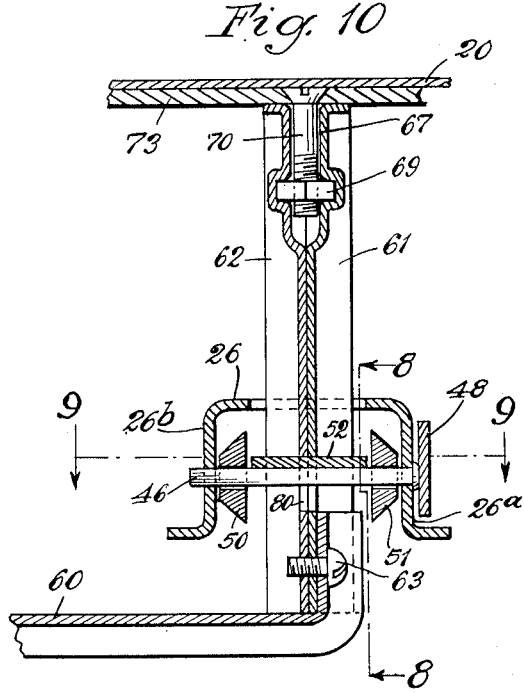
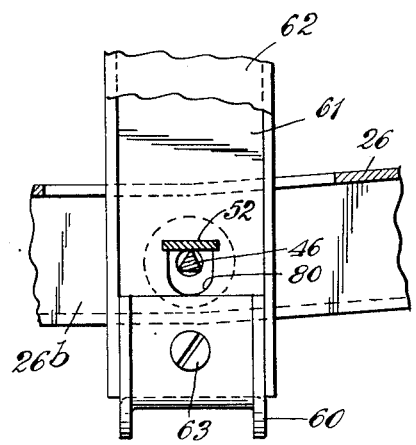
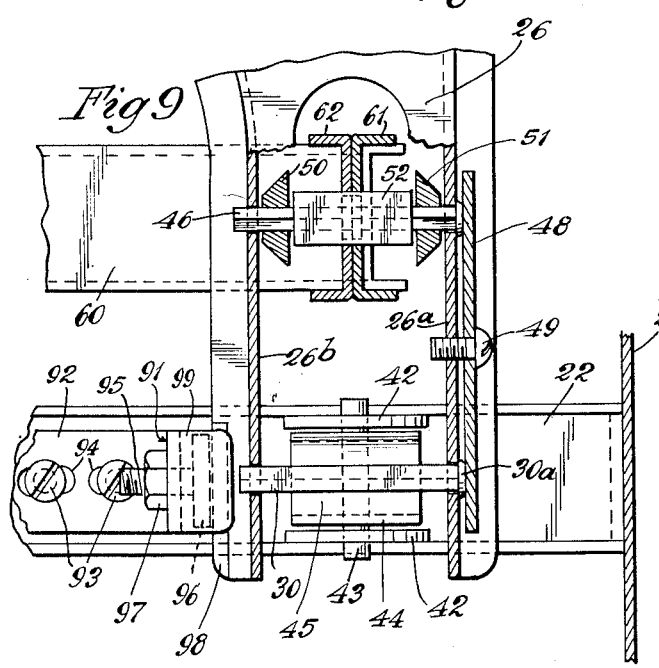
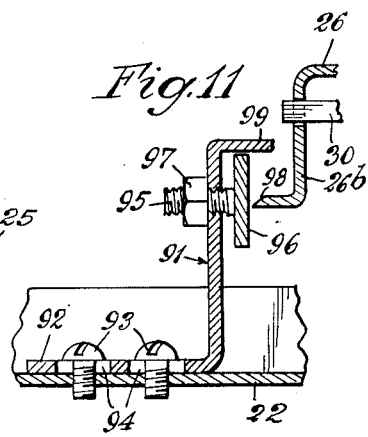
Inventor
Andrew G. Brown
by W. Bartlett Jones,
Attorney.

Patented May 26, 1953

2,639,912

UNITED STATES PATENT OFFICE 2,639,912

WEIGHING SCALE

Andrew G. Brown, Maywood, Ill., assignor to The Griffith Laboratories, Inc., Chicago, Ill., a corporation of Illinois Application June 24, 1947, Serial No. 756,636

1 Claim. (Cl. 265—71)

The present invention relates to weighing scales, and in particular to a weighing scale suitable for use in pickling hams.

Percentage scales for pickling hams are now well-known. They function to indicate the weight of a ham placed thereon, and by operation of an adjustable element which relatively moves two indicators and a dial therefor in such a way that one indicator registers a fixed percentage of the registration of the other indicator. In pickling hams the lower registering indicator is moved to indicate the actual weight of a ham on the dial, whereby the other indicator registers a given percentage increase in that weight. Pickling salt solution is pumped into the ham while it is in a registering position on the scale until the increased weight of the ham brings the weight needle of the scale to a registration coinciding with the registration of the increased-percentage indicator.

Such scales are subject to much abuse, not only mechanically in placing the hams on the scale and working with them, but also by environment. The atmosphere of the pickling room becomes more or less charged with brine mist, and the scale itself becomes wetted with spilled brine. These surface and atmospheric conditions penetrate to the interior of the scale and tend to cause incipient and excessive corrosion in the mechanism. Not only that, but the whole scale itself is subject to be seriously corroded in time.

In the use of pickling scales, a fast pickling-schedule is desired. Ordinary scale mechanisms are tardy in coming to equilibrium and rest after the placement of a ham on the platform, and it is essential in percentage pickling that the weight needle come to rest before the percentage indicators can be accurately positioned.

It is an object of the present invention to produce a new scale mechanism particularly suitable for the conditions prevailing in the pickling of hams.

It is also an object of the invention to minimize the number of parts which, if corroded, can adversely affect the operation or accuracy of the scale.

A particular object of the invention is the provision of a scale with mechanism having certain parts especially resistant to corrosion, and of a structure and relation to the whole to permit them to be readily replaceable.

Another object of the invention is to provide a scale mechanism which minimizes the time required for the weight indicator to come to rest.

Another object of the invention is the provision of a scale with weight-registering mechanism readily adaptable for the addition thereto of a variable percentage mechanism.

The foregoing and other and ancillary objects and advantages of the invention will become apparent from the following description and explanation of the invention as set forth below in reference to the presently preferred and exemplary embodiments thereof shown in the accompanying drawings in which:

Fig. 3 is a vertical cross-section through the scale taken on the line 3—3 of Fig. 2.

Fig. 4 is a vertical cross-section of the scale crosswise of the platform on the line 4—4 of Fig. 3.

Fig. 8 is a detailed view showing in vertical elevation on line 8—8 of Fig. 10, showing one view of a post bearing on its knife-edge support.

Fig. 9 is a detailed fragmentary view showing the mountings of the two knife-edges associated with one side of a lever, and taken in a horizontal plane on line 9—9 of Fig. 10.

Fig. 10 is an enlarged vertical cross-section through the right hand post of Fig. 6 in the plane of the post supporting pivotal axis.

Fig. 11 is a detailed view showing in vertical cross-section the guiding structure for the scale levers.

In general arrangement and construction the scale resembles prior art scales, and employs well-known elements found in the prior art. In the prior art, the scale platform has been hung by suspension devices in such a manner that it has considerable play in all directions, especially in the direction of swing. In particular, it has been a practice heretofore to have the platform supports in the form of four vertical posts, the bottom ends of each post being pivotally supported by the lower end of a link pivotally hung at the top end on a knife-edge carried by the conventional lever arms. Such a structure is shown in Fig. 20 of Patent No. 1,290,415. In a pickling scale each such post presents two pivot lines for corrosion. In use of such vertically suspended platform supports, the platform has considerable play in the direction of the swinging planes of the post linkage. As a result, a period of vibration in said direction is encountered when a ham is placed on the platform, before the mechanism comes to rest. One feature of the present invention is the provision of a platform having the character of a rigid weighing platform directly pivoted on scale lever arms. By such construction the said swinging time is practically eliminated. As a result of this and other features, the platform has substantially rigidity against any horizontal vibration.

Another feature of the scale is the provision of a circular dial with equal arcuate graduations thereon. Although the provision of such registering mechanism is old, it has particular utility for the pickling scale in that it is susceptible to combination therewith of a simple percentage mechanism which is adjustable to vary the percentage indicated, as described in my copending application Serial No. 756,638, filed June 24, 1947, now Patent No. 2,571,415. The circular dial offers advantages in a pickling scale, over prior art pickling scales having the fan-type of dial. In the latter the weight indicator is usually a long needle which swings in a limited arc compared to the weight indicator of a circular dial. As a result the center of the indicator in a fan type is well below the scale markings, and commonly is near the level of the scale platform. As a result, the associated parts of the fan-type scale are located low in its body, and are thus more subjected to the brine mist which prevails most heavily at the lower levels. On the other hand, the needle center of a circular indicator must be higher, and the whole unit may be readily elevated. Thus, a circular dial permits the registering mechanism to be brought to a higher level in the scale body where it is less subjected to corrosive environment.

Figure 1:
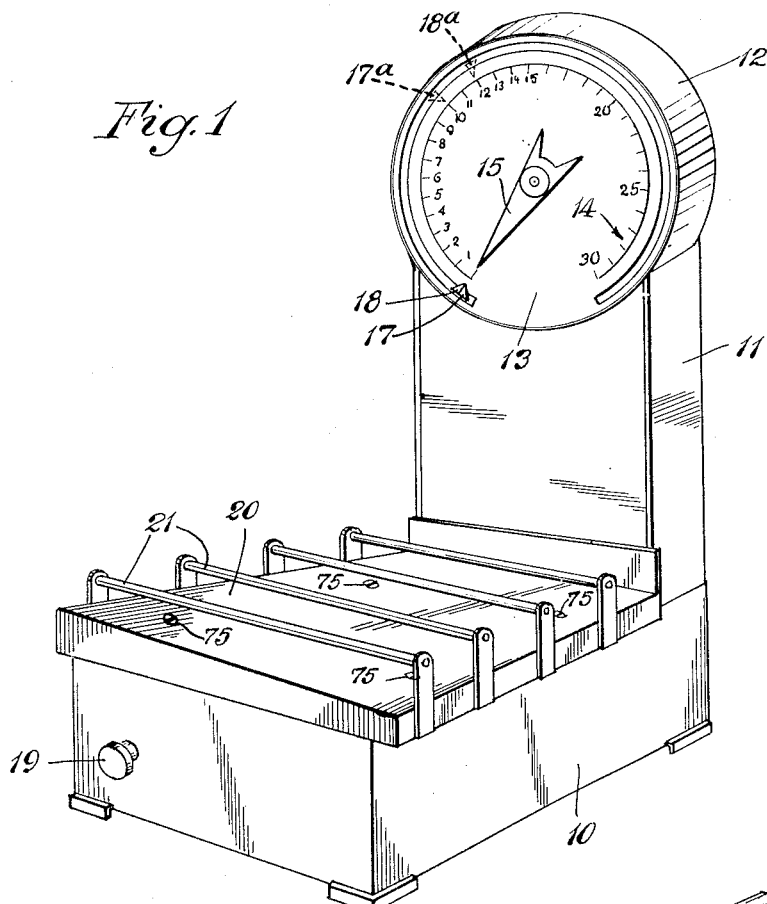
Fig. 1 is a perspective view of the scale.

In Fig. 1 the scale has a base casing 10, and connected thereto an upright casing 11 at its rear, which casing 11 is topped by a rounded head or dial casing 12 presenting at the front a circular dial 13 with equal arcuate graduations 14 circumferentially arranged behind weight indicator or needle 15. Percentage indicators in the form of pointers are indicated by the two triangular elements 17 and 18 shown in Fig. 1 in full lines as having come together at the zero point of the scale. These are also shown in dotted-line positions 17a and 18a registering at 18a a 20% increase of a 10 lb. ham which is indicated by the pointer at 17a. On the front of the casing 10 is a manually operated knob 19 which is turned by the operator to advance the two pointers 17 and 18 to any spaced registration upwardly from zero on the dial 13. A feature described in my copending application Serial No. 756,638, filed June 24, 1947, now Patent No. 2,571,415, is the fact that the turning of knob 19 is without a limit in either direction, thus not to be jammed. It operates in either direction to bring the percentage pointers to the desired place.

The scale mechanisms for causing weight needle 15 to register on dial 13 may be any conventional structures adequate to register the physical displacement of an inclined platform 20 having a grid 21 on which material is placed to be weighed. The inclined platform lets pickle liquor drain off. There is commonly a lever system and a registering system. The lever system within the scale which supports the platform and transmits displacement to the registering system, is now described. Within the casing 10 there are front and rear horizontal crossbars of channel form, indicated at 22 and 23 in Figs. 2 and 3. These are parallel to each other and are suitably secured to the side walls 24 and 25 of the casing, with the channel opening facing upwardly. These crossbars 22 and 23 provides four regions of support for conventional scale levers 26 and 27. Scale lever 26 is a bifurcated frame, of which each bifurcated arm carries means providing a forward horizontal pivotal axis for the entire scale lever 26. Lever 26 is extended rearwardly of the scale as a single arm 28, which arm 28 has a vertical movement transmitted to the registering system for weight needle 15. Lever 27 is likewise bifurcated and swings vertically on a rearward horizontal pivotal axis which is parallel with the pivotal axis of lever 26. The pivotal axis for the lever 26 is indicated in Fig. 3 as the pivotally functioning knife-edge of the triangular element 30, preferably of hardened stainless steel elevated above its supporting crossbar 22. In the same figure the pivotal axis of lever 27 is formed by the pivotally functioning knife-edge of similar triangular element 31 above crossbar 23. From their pivotal axis the levers 26 and 27 approach each other and midway between the pivot axes 30 and 31, and at equal arm lengths, the two arms are pivotally linked together by a ribbon-form link 33 hanging on fixed pivot 34 carried by the lever 26—28. A similar pivot 35 carried by the lever arm 27 is suspended by link 33 from the pivot 34. Link 33 and pivots 34 and 35 are of stainless steel. Thus, the weight lever 27 is suspended from the upper and longer weight lever 26—28. The end of lever 28 is held upwardly by counterbalancing suspending means later to be described, thus to hold the arms 26 and 27 in the position shown in Fig. 3. Dampening means is employed to resist rapid downward movement. This is represented by a dash-pot 37 which has a cylinder carrying a piston 38 linked by piston rod 39 to the arm 28 at the pivot 40. The foregoing general combination is a conventional one.

Figure 2:
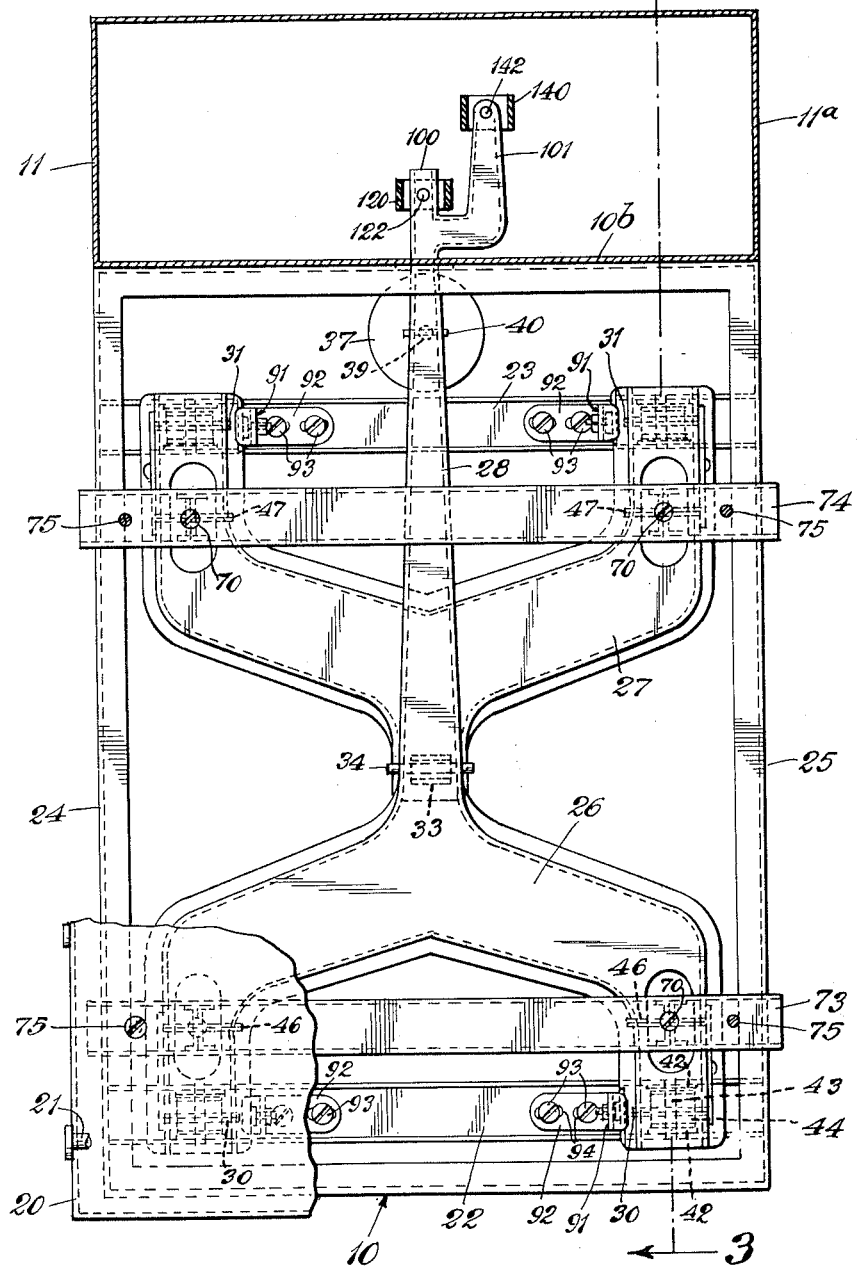
Fig. 2 is a plan view of the scale platform showing the interior construction.

The particular mechanism for mounting the pivots for the levers 26 and 27 respectively on the crossbars 22 and 23, is the same for each pivot location, and is described only with reference to the knife-edge 30. In Figs. 2 and 3, there are shown two opposing vertical lugs 42 secured to the inside of the channel crossbar 22 and extending upwardly from it to provide fixed brackets for a pivotal pin 43 fixedly mounted therein. Freely swinging on the pin 43 is a yoke 44 generally M-shaped, with its indented top 45 providing a V-shaped trough or cradle at the bottom of which the said triangular piece or knife-edge 30 has its knife-edge fulcrum. The knife-edge 30 is carried by the bifurcations of lever 26 as shown in Fig. 9, wherein one end of the steel knife-edge is swedged to form a head 30a.

The four bifurcated pivoted extremities of the levers 26 and 27 provide four pivotal supports for means carrying the weighing platform 20. The two bifurcations of the arm 25 provide on horizontal pivotal axis in which is the functioning knife-edge of a triangular element 46 (Figs. 3 and 9). On the pivotal line of knife-edge 46 there is fulcrumed at spaced locations, vertical post supports for the platform 20. There is thus a fixed distance between the lines of the parallel pivotal axes formed by the respective knife-edges 30 and 46.

Forwardly from the pivotal line of the knife-edge 31 for the rear lever arm 27 there is a second horizontal pivotal axis in which is the functioning knife-edge of the triangular piece 47 (Fig. 3), comparable to and for the same purpose as the pivotal line of the forward knife-edge 46. The location of the pivotal axis of knife-edge 47 forward of the parallel pivotal axis of knife-edge 31 is the same as the distance between the corresponding knife-edges at the forward lever 26. The knife-edges 47 are mounted like the knife-edges 46, as described with reference to Fig. 9.

In Fig. 9, a plate 48 is fixed to the outside vertical wall 26a of lever 26, as by a screw 49. Vertical side walls 26a and 26b have suitable holes (not designated) therein which receive the knife edge with a driven fit to locate the axis in accurate position and alinement. Plate 48 presses on the enlarged heads of the knife-edges 30 and 46. Inside the channel form of lever 26 over the knife-edge 46 are two stainless steel spacer-rings 50 and 51 and between them a hardened stainless steel bearing plate 52 riding on the upwardly pointing knife-edge 46. This plate 52 is carried by a post for supporting the platform.

Figure 6:
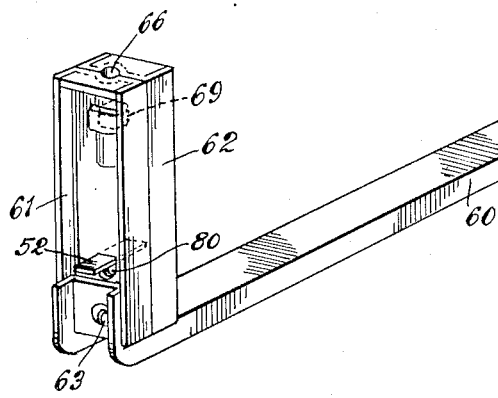
Fig. 6 is a detailed view of a yoke member supporting the weighing platform.

The platform 20 is vertically supported by four vertical post members, comparable to the four braced legs of a table, and these four legs rest with the forward pair on the pivotal axis of the knife-edge 46, while the rearward pair rests upon the pivotal axis of the knife-edge 47. This is practically a fixed support, but owing to the displacement of the levers 26 and 27 in weighing, there is a slight degree of pivotal movement of said posts on said knife-edges 46 and 47. The knife-edges 46 and 47 support four bearing plates like the plate 52 associated with the four vertical supports of the platform 20. In order to give rigidity to the platform structure, and to aline the spaced bearing plates, the forward pair of the supporting vertical posts, and likewise the rearward pair, are respectively joined together below the said fulcrum regions. This is effected by the provision of yokes as shown in Fig. 6 comprising a horizontal channel member 60 terminating in two back-to-back vertical channel or post members 61 and 62, the parts being secured together, as by a screw 63 (see Figs. 6 and 10). Where the channel bottoms of the elements 61 and 62 come together at the top of each post, they are deformed to provide circular openings indicated at 66 and 67, and further deformed below the opening to house a nut such as nut 69 in Fig. 10. The openings 66 and 67 are each for the receipt of a screw or bolt indicated at 70 in Fig. 10 and locked in place by said nut 69. The bolts 70 anchor crossbars 73 and 74 of channel form to the tops of the two supporting yokes such as is shown in Fig. 6, thus to give additional rigidity to the resulting closed frames. The vertical posts on one side are longer than on the other side to give inclination to the platform. To these crossbars 73 and 74 the platform 20 is rigidly secured as by the screws 75 shown in Figs. 1 and 4.

Figure 7:
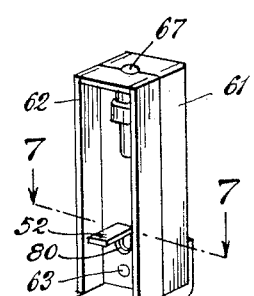
Fig. 7 is a detailed horizontal cross-section view of a post, of the yoke member of Fig. 6, said view being taken on line 7—7 of Fig. 6.

The means for providing a pivotal relation between the posts which support the platform, and the pair of lever arms may vary. Inasmuch as the preferred manner is to provide a knife-edge fulcrum, the area of contact for the knife-edge is preferably provided by the flat horizontal bearing plates 52 above described. Accordingly, each bearing plate 52 is carried by a post which supports the platform. As shown in Fig. 6, there is a hole 80 through the webs of the two channel pieces 61 and 62 forming the post. Plate 52 has a driven fit in the hole 80 which is overly large to allow the knife-edge 46 or 47 to pass through with space to spare, and holes 80 serve to limit movement of the platform by the sliding of plates 52 on the knife-edges 46 and 47. Fig. 7 shows a detail of a post in horizontal cross-section at the top level of plate 52. The same structure prevails at each of the posts to prevent movement of the entire scale platform from side to side of the scale as it appears in Fig. 1. However, this prevention of movement is directly with reference to the scale levers, and full prevention depends also upon holding the scale levers from movement lengthwise of their axes.

The scale levers 26 and 27 are positioned on their axes in a manner to prevent movement lengthwise of the axes by adjustable means. This is more particularly illustrated in Fig. 2 and Fig. 11. On the crossbar 22 along side the inner edges of the bifurcated arms of lever 26 are the brackets 91 each of which has a horizontal portion 93 secured by screws 93 to crossbars 22 or 23 through elongated slots 94. Thus, the brackets are adjustable in lateral position. They are adjusted with reference to the distance between the inner edges of the bifurcated ends of the lever arms 26 or 27 so that there is a slight clearance to minimize friction. These brackets act as centering devices to keep the lever arms 26 and 27 from crawling axially. Additionally, a fine adjustment may also be used in the form of screw 95 presenting flat face 96 on an enlarged head, with its stem threaded into bracket 91 and locked by nut 97. The edge of a flange 98 on lever side wall 26b is sharpened to bear on head 96 with a minimum of friction. Above the said riding surface, the bracket 91 is bent to horizontal position 99, providing a vertical stop against accidental upward movement of the pivoted end of the lever from its cradles. There are two such brackets at each lever, as shown in Fig. 2, and these are adjusted so that the pairs of faces 96 position the pivots 30 (or 31) with easy clearance, and hence position the levers, and resultingly fix the platform.

The remaining portion of the scale is conventional in form, and is only briefly described. Rearwardly of the scale, as shown in Fig. 2, the arm 28 has one end designated 100 which is connected to a conventional counterbalancing device shown in Figs. 3 and 5. Arm 28 also has a lateral offset extension 101 which is connected to a registering mechanism.

Figure 5:
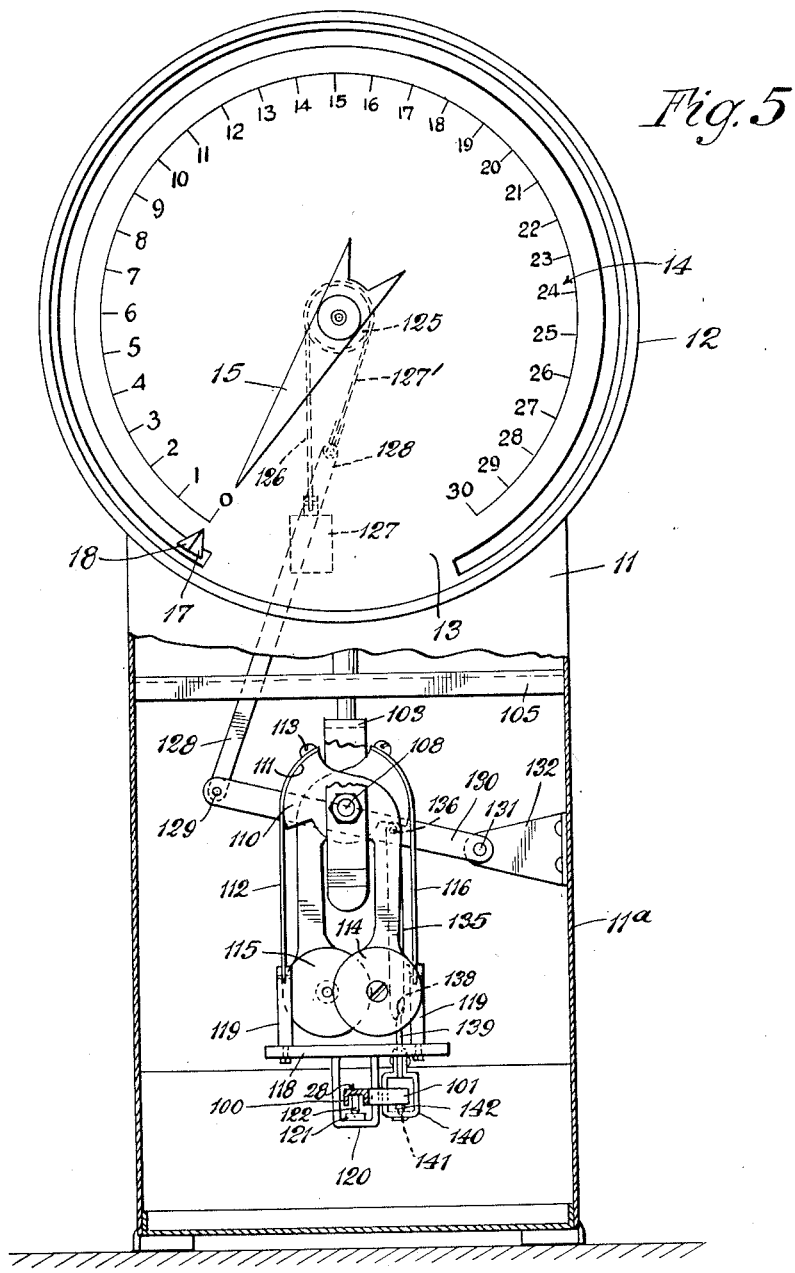
Fig. 5 is an enlarged and fragmentary view of the scale of Fig. 1 taken in front elevation and above the level of the platform.

Upwardly in the vertical portion of the casing 11 there is a crossbar 105 from which is suspended a depending bracket 103 providing front and rear vertical bifurcations 106 and 107. Between these is an axial pin 108 on which rotate counterbalancing means. These are best shown in Fig. 5. They constitute a pair, and are similarly constructed, and movable in reverse directions. On the pin 108 there is a rotatable segment 110 having an arcuate face 111 concentric with pin 108, and on this face there is a steel tape 112 secured by screw 113. A downward pull on tape 112 rotates the segment counterclockwise in Fig. 5 causing the weighted extension of said segment designated 114 to be raised arcuately about the center 108. The companion piece is likewise weighted at 115 and moves clockwise when its tape 116 is pulled downwardly. The tapes are connected to a horizontal bar 118 by adjustable connection means 119. Said bar 118 has a depending yoke or U-shaped bracket 120 bearing a plate 121 with a conical recess tapering downwardly. Into this recess rests a pin 122 which is carried by the extension 100 of the lever arm 28.

As shown in Fig. 5 there is a drum 125 which carries the weight indicator 15. The drum has two tapes secured to it. One of the tapes 126 carries weight 127, and of course this weight is effective to supplement the counterbalancing action of the weighted extensions 114 and 115. The other tape 127' on drum 125 is connected to a substantially linear extension thereof in the form of a rigid link 128 pivoted at 129 to a second link 130 which in turn is pivoted at 131 to a bracket 132 carried by the side wall 11ᵃ (Fig. 5). A substantially vertical link 135, best shown in Fig. 3, is pivoted at its upper end at 136 to the link 130. Link 135 is a flat member which is twisted at 138 to provide the portion 139 to which is secured a yoke member 140 having a conical recess 141 to receive pin 142 carried by the extension 101 of lever arm 28. Thus, depression of the arm 28, by means of an article on the platform 20, causes downward movement of the yokes 120 and 140 in the rear casing, respectively moving the principal counterbalancing system and operating the counterbalanced weight-indicator needle 15.

These parts in the rear casing are walled off from the open space in the casing 10 by the internal partition 10ᵇ (Fig. 3) having a limited opening 10ᶜ therein only sufficiently large to accommodate the movement of the arm 28. This partition coupled with substantially complete closure of the casing portions 11 and 12 serves to keep saline mist away from the counterbalancing and registering means, and to that extent prolong the life of the scale.

By providing the eight knife-edge pivots, and their fulcrums, and other bearing parts, of stainless steel, the expected corrosion of the important coacting elements is minimized and life is prolonged. Also, these parts are simple in structure and may be readily replaced in repairing or rebuilding a scale. Some of the features of construction above described do not essentially improve the operation of the scale, as a delicate mechanical device, but they do function to add life to the scale in corrosive environment, to permit repair and rebuilding at low cost, and to give long life with accuracy sufficient for the special purpose of the scale. Other features improve operation of the scale as already described.

The scale illustrated and described is subject to numerous changes and modifications, and such are contemplated as falling within the scope of the invention as set forth in the appended claim.

I claim:

In a scale having two opposed lever arms pivotally mounted on parallel horizontal axes, pivotally linked together at equal arm lengths, and counterbalanced, the combination therewith of two spaced upwardly presented knife-edges co-axially alined on one lever arm on an axis parallel with and at an arm's length from the pivotal axis of said lever arm, two spaced upwardly directed knife-edges co-axially alined on the second lever arm in parallelism with and at the same arm's length from the axis of said second lever arm, each knife-edge being mounted near its ends in its carrying arm under an opening in said arm for a vertical support pivotally bearing on the knife-edge, a weighing platform, four vertical supports for said platform each passing through one of said openings and each in turn having an opening intermediate its ends through which passes the corresponding knife-edge, a knife-edge bearing carried by each of said vertical supports within its said opening and resting on one of said four knife-edges in support of said platform, and spaced rings about each knife-edge within its supported ends fixed relative to the lever arm and just clearing the ends of the bearing to avoid friction thereby to prevent substantial relative axial movement of each bearing and its knife-edge.

ANDREW G. BROWN.

References Cited in the file of this patent

UNITED STATES PATENTS

| Number | Name | Date |
|---|---|---|
| 1,290,415 | Triner | Jan. 7, 1919 |
| 1,359,470 | Spinello | Nov. 16, 1920 |
| 1,553,503 | Brown | Sept. 15, 1925 |
| 1,600,155 | Wetzel | Sept. 14, 1926 |
| 1,759,886 | Bousfield | May 27, 1930 |
| 2,006,864 | Klosterman | July 2, 1935 |
| 2,049,632 | Sutton | Aug. 4, 1936 |
| 2,061,271 | Eschenbacher | Nov. 17, 1936 |
| 2,069,757 | Hansen | Feb. 9, 1937 |
| 2,073,912 | Walker | Mar. 16, 1937 |
| 2,098,846 | Weber | Nov. 9, 1937 |
| 2,258,648 | Hadley | Oct. 14, 1941 |

FOREIGN PATENTS

| Number | Country | Date |
|---|---|---|
| 585,862 | France | Mar. 9, 1925 |